US012541358B2

(12) United States Patent
Inoue

(10) Patent No.: US 12,541,358 B2
(45) Date of Patent: Feb. 3, 2026

(54) PROGRAM UPDATE CONTROL APPARATUS, PROGRAM UPDATE CONTROL METHOD AND NON-TRANSITORY COMPUTER-READABLE STORAGE MEDIUM

(71) Applicant: Honda Motor Co., Ltd., Tokyo (JP)

(72) Inventor: Genta Inoue, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 190 days.

(21) Appl. No.: 18/369,990

(22) Filed: Sep. 19, 2023

(65) Prior Publication Data

US 2024/0385822 A1 Nov. 21, 2024

Related U.S. Application Data

(60) Provisional application No. 63/502,155, filed on May 15, 2023.

(51) Int. Cl.
G06F 8/65 (2018.01)
G07C 5/00 (2006.01)

(52) U.S. Cl.
CPC .............. G06F 8/65 (2013.01); G07C 5/008 (2013.01)

(58) Field of Classification Search
CPC .................................................. G06F 8/61–65
See application file for complete search history.

(56) References Cited

U.S. PATENT DOCUMENTS

| | | | |
|---|---|---|---|
| 10,052,964 | B2 | 8/2018 | Park et al. |
| 11,529,886 | B2 | 12/2022 | Niu et al. |
| 2020/0215930 | A1 | 7/2020 | Izumi |
| 2021/0094491 | A1 | 4/2021 | Yamashita |
| 2021/0157570 | A1* | 5/2021 | Harata ............... B60R 16/02 |
| 2022/0032807 | A1 | 2/2022 | Asami |
| 2022/0097565 | A1 | 3/2022 | Komatsu et al. |
| 2022/0100529 | A1* | 3/2022 | Okajima ............. H02J 7/0063 |
| 2022/0258640 | A1 | 8/2022 | Ando |

FOREIGN PATENT DOCUMENTS

| | | |
|---|---|---|
| CN | 114860287 A | 8/2022 |
| CN | 115891862 A | 4/2023 |
| JP | 2011-894 A | 1/2011 |
| JP | 2021-27695 A | 2/2021 |
| JP | 6992377 B2 | 2/2022 |
| JP | 7193940 B2 | 12/2022 |
| KR | 10-2020-0027777 A | 3/2020 |
| KR | 10-2020-0051211 A | 5/2020 |

* cited by examiner

Primary Examiner — Duy Khuong T Nguyen
(74) Attorney, Agent, or Firm — WHDA, LLP

(57) ABSTRACT

A program update control apparatus acquires new program from an external apparatus via a network and rewrites a program of an electronic control unit equipped with a mobile object during drive of the mobile object is disabled. The mobile object includes a low-voltage power system comprising a low-voltage battery configured to supply electrical power to a rewriting control unit and the electronic control unit, a high-voltage power system comprising a high-voltage battery configured to store electric energy to move the mobile object, and a step-down converter configured to step-down convert the power of the high-voltage battery to the power of the low-voltage power system. When the rewriting is performed, the step-down converter is activated to supply power from the high-voltage power system to the low-voltage power system.

17 Claims, 10 Drawing Sheets

| ECU ID | PROGRAM ID | STATUS |
|---|---|---|
| E001 | P001 | CONSENT ACQUISITION COMPLETED<br>WRITING |
| E002 | P002 | WRITING COMPLETED<br>CONSENT ACQUISITION COMPLETED |

FIG.7

PROGRAM UPDATE CONTROL APPARATUS, PROGRAM UPDATE CONTROL METHOD AND NON-TRANSITORY COMPUTER-READABLE STORAGE MEDIUM

CROSS REFERENCES TO RELATED APPLICATIONS

The present application claims the benefit of U.S. Provisional Application No. 63/502,155, filed May 15, 2023, entitled "program update control apparatus, program update control method and non-transitory computer-readable storage medium." The contents of this application are incorporated herein by reference in their entirety.

BACKGROUND

Technical Field

The present disclosure relates to a program update control apparatus, a program update control method and a non-transitory computer-readable storage medium.

Related Art

An Electronic Control Unit (ECU) which is equipped with a mobile object such as a vehicle provides various functions implemented by executing a software program. The software program is updated by a program update control system.

SUMMARY

In one aspect of the present disclosure, a program update control apparatus comprises:
  an acquisition processor acquiring new program from an external apparatus via a network;
  a rewriting control processor performing a rewriting control of rewriting a program of an electronic control unit equipped with a mobile object, the rewriting being performed by using the acquired new program during drive of the mobile object is disabled;
  a low-voltage power system comprising a low-voltage battery configured to supply electrical power to the rewriting control unit and the electronic control unit;
  a high-voltage power system comprising a high-voltage battery configured to store electric energy to move the mobile object;
  a step-down converter configured to step-down convert the power of the high-voltage battery to the power of the low-voltage power system, wherein
  when the rewriting control processor performs the rewriting control of the rewriting the program of the electronic control unit, the rewriting control processor activates the step-down converter to supply power from the high-voltage power system to the low-voltage power system via the step-down converter.

BRIEF DESCRIPTION OF THE DRAWINGS

The advantages of the disclosure will become apparent in the following description taken in conjunction with the following drawings.

FIG. 7 shows an example of a data structure of update information that is managed by an ECU 202.

DESCRIPTION OF EXEMPLARY EMBODIMENTS

Hereinafter, the present disclosure will be described through embodiments, but the following embodiments do not limit the invention according to the claims. In addition, not all combinations of features described in the embodiments are essential to the solution of the invention.

Figure 1:
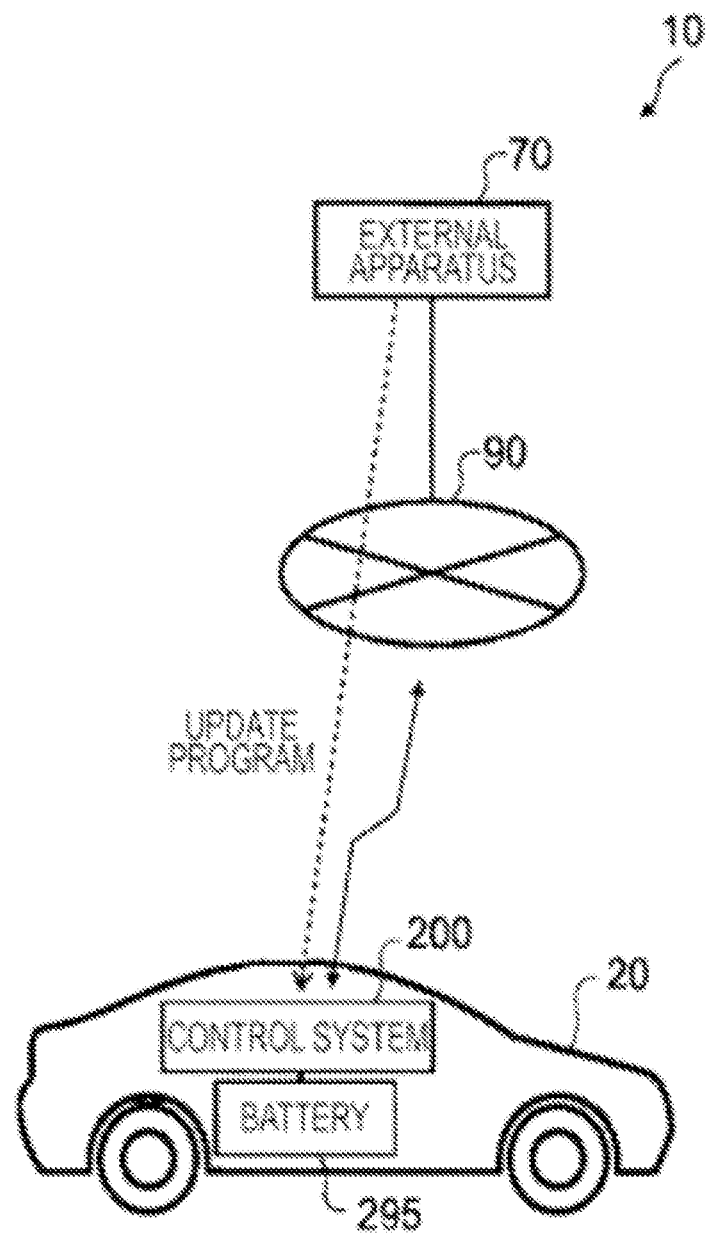
FIG. 1 schematically shows an update system 10 according to one embodiment.

FIG. 1 schematically shows an update system 10 according to one embodiment. The update system 10 includes a vehicle 20 and an external apparatus 70. The vehicle 20 includes a control system 200. The control system 200 is responsible for control of the vehicle 20 and communication with the external apparatus 70 via a communication network 90. The communication network 90 includes an IP network such as the Internet, a P2P network, a dedicated line including a VPN, a virtual network, a mobile communication network, and the like.

In the vehicle 20, the control system 200 includes a plurality of ECUs (Electronic Control Units) configured to perform control of the vehicle 20. The control system 200 is configured to acquire an update program of the ECU provided to the control system 200 from an outside. For example, the control system 200 is configured to receive an update program, which is transmitted from the external apparatus 70, via the communication network 90 by wireless communication. The control system 200 is configured to reprogram the ECU provided to the control system 200 by rewriting a program, which is executed by the ECU provided to the control system 200, with the update program. Such reprogramming is performed for upgrade and the like of functions of the ECU provided to the control system 200. In this way, the control system 200 is configured to update the ECU by reprogramming the ECU by OTA (Over The Air). In the present embodiment, rewriting a program, which is executed by a device such as the ECU, by the update program is referred to as 'program update'.

At least a part of processing relating to the program update of the ECU is executed, for example, when an IG power supply of the vehicle 20 is off. For example, when the IG power supply becomes off, the control system 200 is configured to acquire a user's consent to execute the program update. When the control system 200 acquires the user's consent to execution of the program update, the control system is configured to store consent information, which indicates that the user has consented to execution of the program update, and to start predetermined processing, which is to be executed in a state where the IG power supply is off, of the processing relating to the program update. The state in which the IG power supply of the vehicle 20 is off is merely one example during which the program update of the ECU is executed. More generally, the program update of the ECU is executed during drive of the electric vehicle is disabled. For example, some electric vehicles do not have an IG power switch. In such a case as well, the program update of the ECU is executed during drive of the electric vehicle is disabled.

When the IG power supply of the vehicle 20 is off, electrical power necessary for the program update is supplied from a battery (low-voltage battery) of a power supply voltage 12V provided to the vehicle 20. For this reason, when the user removes the battery of the vehicle 20 after the IG power supply becomes off and the program update is started, the electrical power for continuing the program update cannot be supplied to the control system 200, so that the program update is interrupted. When the user remounts a battery 295, the control system 200 is activated by the electrical power supplied from the battery. At this time, in a case where the control system 200 holds the consent information, the control system may resume the program update without reacquiring the consent information. In this way, according to such a control system 200, even if a case occurs in which the electrical power is not supplied due to an external factor such as the user removing the battery, the program update can be continued without reacquiring the user's consent when the electrical power supply is restored (scheme I).

On the other hand, in this scheme I, the program update remains interrupted until the battery is re-installed. Then, after the battery is re-installed, the remaining part of the program update is resumed and performed. In other words, it still takes time to complete the remaining part of the program update after the battery is re-installed. Therefore, a user may need to wait for a while until the remaining part of the program update has been completed before driving the vehicle 20. Thus, it is desirable to reduce wait time caused by the program update. For example, a step-down converter is configured to step-down convert the power of a high-voltage battery to the power of a low-voltage power system. When performing rewriting control of rewriting a program of an electronic control unit, the step-down converter is activated to supply power from the high-voltage power system to the low-voltage power system via the step-down converter (Scheme II). By the scheme II, even when the user removes the battery of the vehicle 20 after the program update is started, it becomes possible to continue the program update by using the power provided from the high-voltage power system to the low-voltage power system via the step-down converter, which makes it possible to reduce wait time caused by the program update during which the user cannot drive the vehicle.

Figure 2:
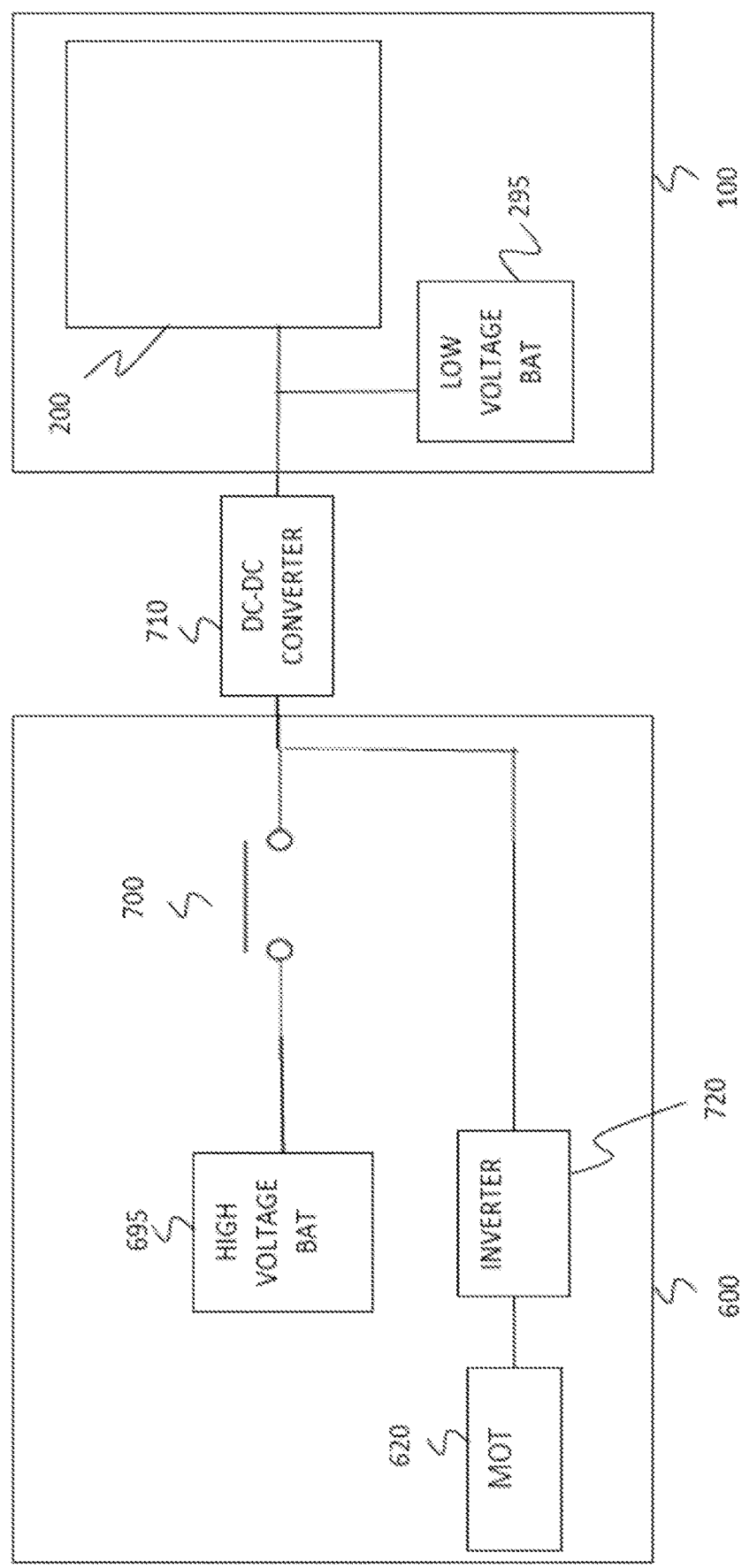
FIG. 2 schematically shows a system configuration of a power system of the vehicle 20.

FIG. 2 schematically shows a system configuration of a power system of the vehicle 20. The power system includes a low-voltage power system 100 and a high-voltage power system 600. The low-voltage power system 100 includes a low-voltage battery 295 and the control system 200. The battery 295 functions as a 12V or 48V power supply for a vehicle, for example. The battery 295 may be an auxiliary battery. The high-voltage power system 600 includes a high-voltage battery 695 and a component such as an electric drive motor 620 which uses power from the high-voltage power system 600. The battery 695 functions as 200V-800V power supply for a vehicle, for example. For a typical Hybrid Electric Vehicle (HEV), the battery 695 functions as 200V power supply. The high-voltage battery 695 is coupled to the low-voltage power system 100 via a switch such as a contactor 700 for emergency shutdown and a step-down DC-DC converter 710. The high-voltage power system 600 also includes an inverter 720 which converts a DC input power into a three-phase AC output power which is supplied to the electric drive motor 620.

By activating the step-down converter 710, power is supplied from the high-voltage power system 600 to the low-voltage power system 100 (to the low-voltage battery 295 and the control system 200) via the step-down converter 710. The vehicle 20 is an example of a mobile object. The mobile object of the present embodiment can be a mobile object which includes a high-voltage power system and a low-voltage power system. For example, the vehicle 20 may be an electric vehicle such as a Battery Electric Vehicle (BEV), a Hybrid Electric Vehicle (HEV), a Plug-in Hybrid Electric Vehicle (PHEV), an Extended Range Electric Vehicle (EREV).

Figure 3:
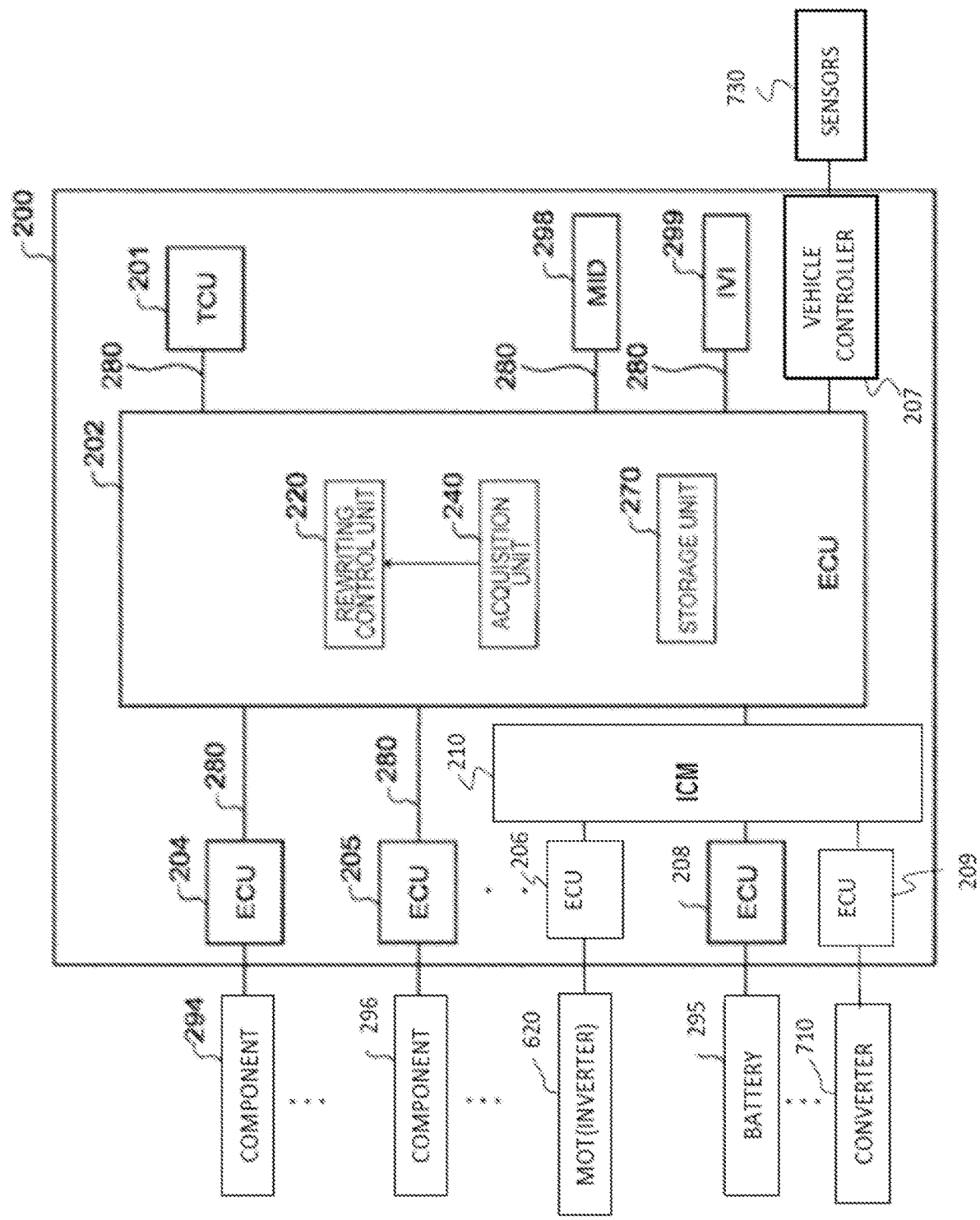
FIG. 3 schematically shows a system configuration provided to a control system 200, together with a to-be-controlled device.

FIG. 3 schematically shows a system configuration provided to the control system 200, together with a to-be-controlled device. The control system 200 has a TCU 201, an ECU 202, an ECU 204, an ECU 205, an ECU 206, an ECU 208, an ECU 209, an MID 298, an IVI 299, and an Intelligent Control Module (ICM) 210. The ICM 210 is a control unit which manages and controls a vehicle drive system such as the electric drive motor 620, the battery 295 and the step-down DC-DC converter 710.

The ECU 202 is connected to the TCU 201, the ECU 204, the ECU 205 and the ICM 210 as well as a vehicle controller 207 via an in-vehicle communication line 280. The ECU 202 is configured to mutually communicate with the TCU 201, the ECU 204, the ECU 205, the ICM 210, the MID 298, the vehicle controller 207 and the IVI 299 via the in-vehicle communication line 280. The ECU 202 is configured to collectively control the TCU 201, the ECU 204, the ECU 205, the ICM 210, the MID 298 and the IVI 299. The in-vehicle communication line 280 may be configured to include a CAN (Controller Area Network), an Ether Network and the like, for example. The ECU 202 is also configured to control the ECU 206, the ECU 208, and the ECU 209 via the ICM 210.

The TCU 201 is a telematics control unit. The TCU 201 is mainly responsible for mobile communication. The TCU 201 is configured to transmit and receive data to and from the external apparatus 70, based on control of the ECU 202. The TCU 201 is configured to receive the update program transmitted from the external apparatus 70 by mobile communication, based on control of the ECU 202. The TCU 201 can function as a wireless communication unit.

The MID 298 is a multi-information display. The IVI 299 is, for example, an in-vehicle infotainment information device (IVI). The MID 298 and the IVI 299 can function as a display control unit. The IVI 299 has a wireless LAN communication function. The IVI 299 is configured to receive the update program transmitted from the external apparatus 70 by wireless LAN communication, based on control of the ECU 202.

The ECU 204, the ECU 205, the ECU 206, the ECU 208 and the ECU 209 are each an ECU as a vehicle control unit configured to control at least a part of the vehicle 20. The ECU 204, the ECU 205, the ECU 206, the ECU 208 and the ECU 209 are examples of the 'mobile object control unit'. The ECU 204, the ECU 205, the ECU 206, the ECU 208 and the ECU 209 are configured to control a variety of devices provided to the vehicle 20. ECU 204 and ECU 205 are the first electronic control unit which is not related to a control of a component of the mobile object which is a part of the high-voltage power system. For example, the ECU 204 is configured to control a component such as a power window 294, and the like. The ECU 205 is configured to control a component such as an automatic light 296w, and the like.

ECU 206 and ICM 210 are the second electronic control unit which controls a component of the mobile object which is a part of the high-voltage power system. For example, the ECU 206 is configured to control the electric motor 620 (via the inverter 720), and the like. Next, the ECU 208 is configured to control the battery 295, and the like. The battery 295 functions as a 12V or 48V power supply for a vehicle, for example. The battery 295 is, for example, a lead storage battery or the like. The ECU 209 is configured to control the converter 710, and the like. The electric motor 620, the battery 295 and the converter 710 are examples of components of a vehicle drive system which is managed and controlled by the ICM 210. Note that, in FIG. 3, the power window 294, the automatic light 296, the battery 295, the converter 710 and the electric motor 620 are examples of the to-be-controlled device provided to the vehicle 20, and the vehicle 20 may have a to-be-controlled device other than the devices shown in FIG. 3.

In the present embodiment, the system configuration where the control system 200 includes the TCU 201, the ECU 202, the ECU 204, the ECU 205, the ECU 206, the ECU 208. The ECU 209, the ICM 210, the MID 298 and the IVI 299 is exemplified. However, the system configuration of the control system 200 is not limited to the example of the present embodiment. In addition, in the present embodiment, as an example, it is described that the mobile object control unit that may be a target of the program update is the ECU 204, the ECU 205, the ECU 206, the CIM 210, and the ECU 202 functions as a 'program update control apparatus' configured to control the program update. Note that, the mobile object control unit that may be a target of the program update is not limited to these ECUs. The mobile object control unit that may be a target of the program update may be any of the TCU 201, the ECU 202, the ECU 204, the ECU 205, the ECU 206, the ECU 208, the ECU 209, the ICM 210, the MID 298 and the IVI 299.

The ECU 202 is configured to function as a program update control apparatus configured to control the program update of the ECU. The ECU 202 includes a rewriting control unit 220, an acquisition unit 240, and a storage unit 270.

The rewriting control unit 220 is configured to perform control of rewriting a program, which is executed by the ECU configured to control at least a part of the vehicle 20, to a new program. The acquisition unit 240 is configured to acquire a new program from the external apparatus. Before starting the rewriting, the rewriting control unit 220 is configured to request the user to consent to execution of the rewriting, and to hold consent information, which indicates that the user has consented to execution of the rewriting. When activated in response to the power supply being on, the rewriting control unit 220 is configured to cause the rewriting to be executed without requesting the user to consent to execution of the rewriting, on the condition that the consent information is held.

The rewriting control unit 220 may be configured to further hold execution state information indicative of an execution state of rewriting. When activated in response to the power supply being on, the rewriting control unit 220 is configured to cause rewriting of a program to be resumed, based on the held execution state information, on the condition that the consent information is held.

The rewriting control unit 220 may be configured to hold identification information for identifying an ECU that is an execution target of rewriting. When activated in response to the power supply being on, the rewriting control unit 220 is configured to cause an ECU identified with the identification information to be activated and to cause the ECU to execute rewriting, on the condition that the consent information is held.

The rewriting control unit 220 sends an activation signal and a deactivation signal to the ECU 209 to activate and deactivate the step-down converter 710 to supply power from the high-voltage power system 600 to the low-voltage power system 100 via the step-down converter 710.

Figure 4:
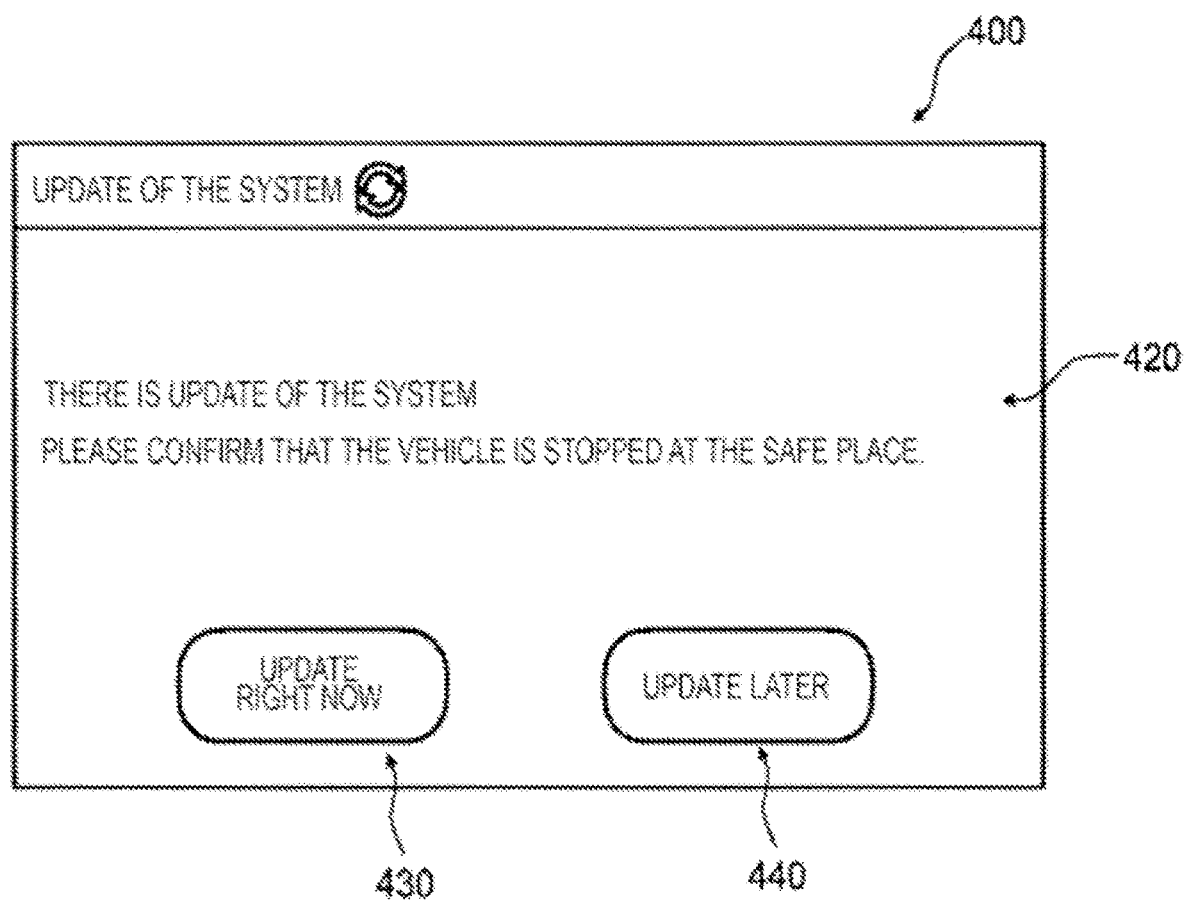
FIG. 4 shows an example of a consent acquisition screen 400.

The program update of an ECU having a plurality of storage areas as a storage area of a program is described. In the present embodiment, it is assumed that the ECU 205 has a plurality of storage areas. The ECU 205 may include a storage unit having a first storage area and a second storage area. The ECU 205 is configured to read either a program stored in the first storage area or a program stored in the second storage area at boot-up. In a case where a program that is executed by the ECU 205 is stored in the first storage area, the rewriting control unit 220 is configured to cause writing of a new program to the second storage area to be started. More specifically, the rewriting control unit 220 acquires the new program by downloading the new program from the external apparatus 70, and then, overwrites the second storage area by using the downloaded new program. The downloading and the overwriting processes are performed during the IG power supply on. The rewriting control unit 220 waits a situation in which the IG power supply is turned off. When the IG power supply is turned off, the rewriting control unit 220 acquires a consent from a user. For example, the rewriting control unit 220 causes the IVI 299 to display a consent acquisition screen 400 shown in FIG. 4. The consent acquisition screen 400 includes message information 420 for a user, a UI button 430 for acquiring a user's consent to the program update, and a UI button 440 for acquiring, from the user, an effect that the user does not consent to the program update. When a position of the UI button 430 is operated, the rewriting control unit 220 determines that the user has consented to the program update, and stores the consent information in the storage unit 270. After acquiring a consent from a user, the rewriting control unit 220 performs a rewriting control of rewriting a program of the ECU 205. Here, the rewriting of the program of the ECU 205 which has a plurality of storage areas means switching the storage area to be executed from the first storage area to the second storage area which has been overwritten.

Program update processing that is executed when a storage unit provided to an ECU is a double bank memory (so-called double-sided ROM) is described. In this case, since the ECU has two program storage areas for firmware storage, the update program can be written to a second program storage area when the ECU is operating according to a program stored in a first program storage area. That is, by so-called backside writing, the update program can be written to the second program storage area that is a backside. Therefore, for example, even when the vehicle 20 is traveling, the update program can be written to the second program storage area. For this reason, when the rewriting control unit 220 transfers the update program to the ECU, the rewriting control unit instructs the ECU to write the update program to the second program storage area. When the writing of the update program to the second program storage area of the ECU is completed, a state where the program update of the ECU can be performed becomes. When the rewriting control unit 220 performs the program update of the ECU, the rewriting control unit 220 instructs the ECU to activate the update program written to the second program storage area. The activation of the update program includes, for example, processing of setting an activation parameter of the ECU so as to start control based on the update program by loading the update program stored in the second program storage area at boot-up of the ECU. For example, the activation of the update program includes processing of enabling the second program storage area as a program reading area and disabling the first program storage area as a program reading area. Like this, the 'program update' is a concept that includes instructing to write the update program to the program storage area of the ECU. In addition, the 'program update' is a concept that includes instructing to activate the update program written to the program storage area.

The program update of an ECU having a single storage area as a storage area of a program is described. In the present embodiment, it is assumed that the ECU 204 has a single storage area. The ECU 204 includes a storage unit having a single storage area configured to store a program that is executed by the ECU 204. When starting rewriting, the rewriting control unit 220 is configured to erase an area in which the program in the storage area is stored, and to cause the ECU 204 to start writing of a new program into the storage area. More specifically, the rewriting control unit 220 acquires the new program by downloading the new program from the external apparatus 70 and stores the downloaded new program to the storage unit 270. The downloading process is performed during the IG power supply is on. Then, the rewriting control unit 220 waits a situation in which the IG power supply is turned off. After acquiring a consent from a user, the rewriting control unit 220 performs a rewriting control of rewriting a program of the ECU 204. Here, the rewriting of the program of the ECU 204 which has a single storage area means erasing the single storage area and writing the downloaded new program into the single storage area.

Here, the program update is described. Program update processing that is executed when a device that is a target of the program update is an ECU and a memory for firmware storage of the ECU is a single bank memory (so-called singled-sided ROM) is described. In this case, since a program storage area for firmware storage of the ECU is one, the update program cannot be written to the program storage area when the ECU is operating according to a program stored in the program storage area. When performing the program update of the ECU, the rewriting control unit 220 is configured to transfer the update program stored in the storage unit 270 to the ECU, to cause the update program to be stored in a predetermined data storage area of the ECU, and thereafter, to instruct the ECU for the program update. When the program update is instructed, the ECU is configured to execute a control code for performing the program update, to write the update program transferred to the data storage area to the program storage area, and to activate the update program. The activation of the update program includes, for example, processing of setting an activation parameter of the ECU so as to start control based on the update program by loading the update program at boot-up of the ECU.

In the program update of the ECU including a storage unit of a single bank memory, there occurs a possibility that the ECU cannot control the vehicle during a period for which the update program is written to the program storage area and during a period for which the update program is activated. On the other hand, in the program update of the ECU including a storage unit of a double bank memory, the ECU can control the vehicle during a period for which the update program is written to the program storage area of a backside. In the present embodiment, it is described that the ECU 204 has a single bank memory and the ECU 205 has a double bank memory.

Low-Voltage Power System Component Control ECU Update

Figure 5:
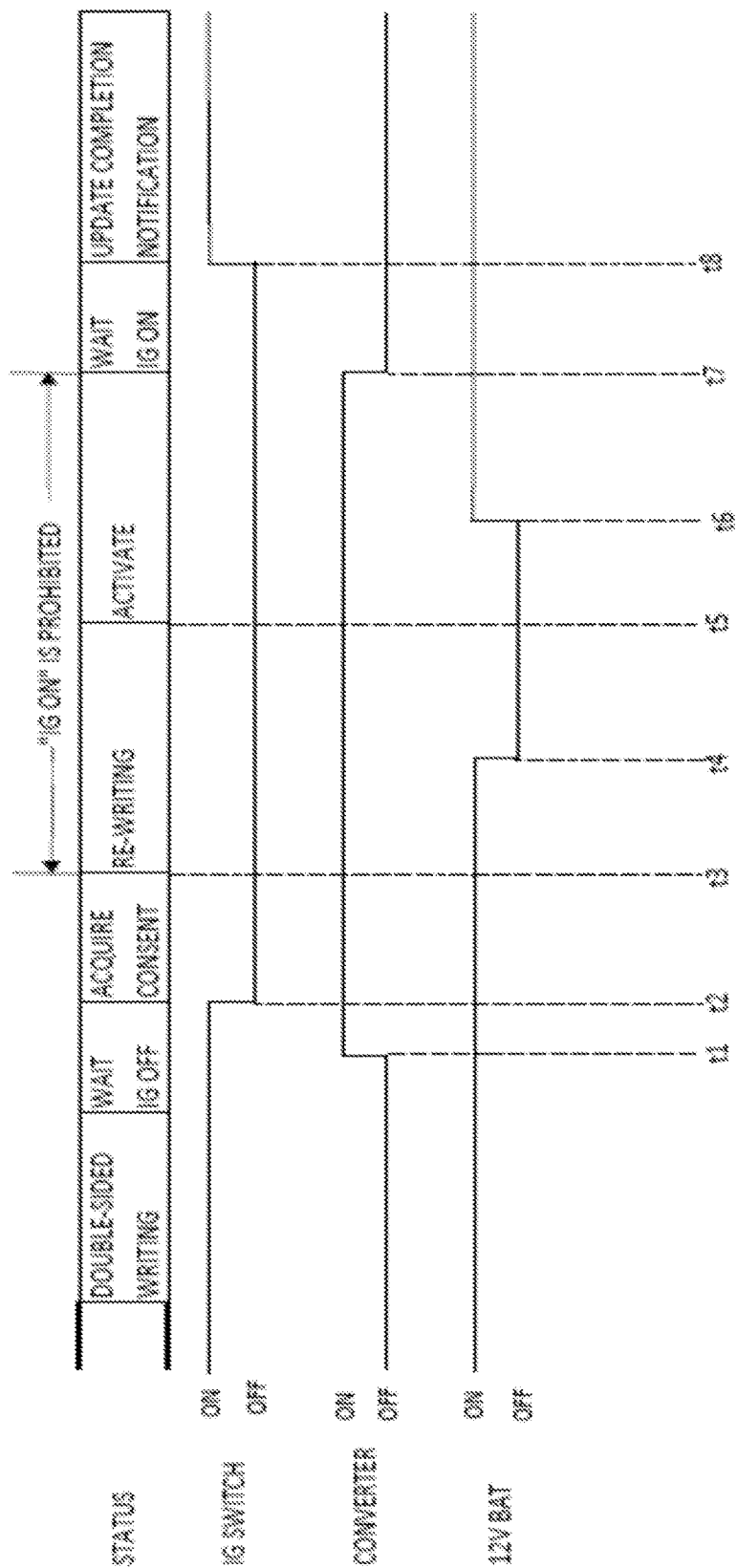
FIG. 5 schematically shows a time chart relating to program update processing.

FIG. 5 schematically shows a time chart relating to program update processing. FIG. 5 shows a state of an IG switch, an activation state of the converter, and an execution state of program update-related processing that is executed in the control system 200. Note that, FIG. 5 is a time chart when performing the program update of the ECU 204 and the ECU 205. Here, it is assumed that the writing of the update program to the ECU 205 is completed before the IG power supply becomes off. ECU 204 and ECU 205 are not connected to and not controlled by the ICM 210. ECU 204 and ECU 205 are also the first electronic control unit which is not related to a control of a component of the mobile object which is a part of the high-voltage power system.

Before the IG switch becomes off at time t2, the overwriting of the update program of the ECU 205 including the double bank memory to the second program storage area is completed (double-sided writing). Also, before the IG switch becomes off at time t2, the rewriting control unit 220 determines whether the mobile object becomes stopped state, and if so, activates the step-down converter to supply power from the high-voltage power system to the low-voltage power system via the step-down converter. Details of the determination whether the mobile object becomes stopped state are described below. When the IG switch becomes off at time t2 by the user, the rewriting control unit 220 causes the IVI 299 to display the consent acquisition screen 400 so as to acquire a user's consent to the program update. When a user's consent to the update program is acquired through IVI 299 at time t3, the rewriting processing is performed, that is, content of the program storage area of the ECU 204 is erased and the writing of the update program is started. Alternatively, the rewriting of the program of the ECU 205 which has a plurality of storage areas is performed by switching the storage area to be executed from the first storage area to the second storage area which has been overwritten.

When the battery 295 is removed at time t4, the power supply state of the ECU 202 is not affected. The power is supplied from the high-voltage power system to the low-voltage power system via the step-down converter such that the rewriting of the update program continues. When the rewriting of the update program is completed at time t5, the rewriting control unit 220 causes the ECU 204 and the ECU 205 to execute activation of the update program. When the battery 295 is remounted at time t6, the activation of the update program continues. When the activation is completed at time t7, the rewriting control unit 220 deactivates the step-down converter to stop supplying power from the high-voltage power system to the low-voltage power system via the step-down converter. Also, the rewriting control unit 220 becomes deactivated and wait the IG switch becomes on.

When the IG switch becomes on at time t8, the rewriting control unit 220 causes the IVI 299 to display an update end screen, which indicates that the program update is over, thereby notifying the user that the program update is completed. In this way, according to the control system 200, even if the battery 295 is removed during the program update, the program update processing can be continued without interruption, and therefore, the program update can be completed without delay. Thus, it is possible to avoid a situation that a user is forced to wait until the program update is completed when the user desires to drive and move the mobile object.

High-Voltage Power System Component Control ECU Update

Figure 6:
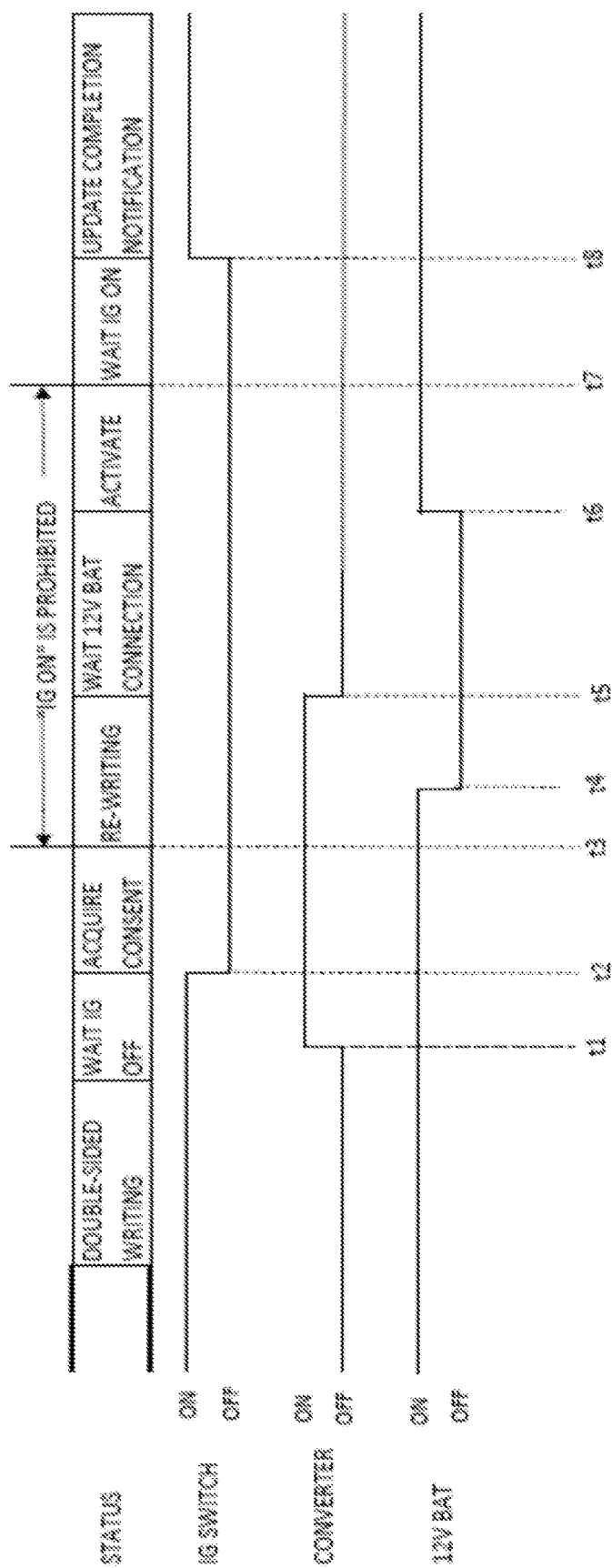
FIG. 6 schematically shows a time chart relating to program update processing.

FIG. 6 schematically shows a time chart relating to program update processing. FIG. 6 shows a state of an IG switch, an activation state of the converter, and an execution state of program update-related processing that is executed in the control system 200. Note that, FIG. 6 is a time chart when performing the program update of the ECU 206 and the ICM 210. ECU 206 and ICM 210 are the second electronic control unit which controls a component of the mobile object which is a part of the high-voltage power system. Here, description is presented by using the ECU 206 as an example. Also, it is assumed that the writing of the update program to the ECU 206 is completed before the IG power supply becomes off.

Before the IG switch becomes off at time t2, the overwriting of the update program of the ECU 206 including the double bank memory to the second program storage area is completed (double-sided writing). Also, before the IG switch becomes off at time t2, the rewriting control unit 220 determines whether the mobile object becomes stopped state, and if so, activates the step-down converter to supply power from the high-voltage power system to the low-voltage power system via the step-down converter. When the IG switch becomes off at time t2 by the user, the rewriting control unit 220 causes the IVI 299 to display the consent acquisition screen 400 so as to acquire a user's consent to the program update. Note that, when there is an update program, the power supply state of the ECU 202 becomes on so as for the ECU 202 to enable processing relating to the program update. When a user's consent to the update program is acquired through IVI 299 at time t3, the rewriting processing is performed, that is, content of the program storage area of the ECU 204 is erased and the writing of the update program is started. Alternatively, the rewriting of the program of the ECU 205 which has a plurality of storage areas is performed by switching the storage area to be executed from the first storage area to the second storage area which has been overwritten.

When the battery 295 is removed at time t4, the power supply state of the ECU 202 is not affected. The power is supplied from the high-voltage power system to the low-voltage power system via the step-down converter such that the writing of the update program continues. When the rewriting of the update program is completed at time t5, the rewriting control unit 220 deactivates the step-down converter to stop supplying power from the high-voltage power system to the low-voltage power system via the step-down converter. Then, the rewriting control unit 220 determines whether the battery 295 is remounted or not.

The ECU 202 is electrically connected to the battery 295. In a case where the ECU 202 is electrically connected to the battery 295, the ECU 202 can operate with the electrical power supplied from the battery 295. In a case where the battery 295 is mounted on the vehicle 20, the rewriting control unit 220 is configured to sense that the battery 295 is mounted on the vehicle 20, based on a signal that is output from the battery 295 in response to the battery 295 being mounted on the vehicle 20. For example, the ECU 202 may be configured to acquire a signal, which is generated in response to the battery 295 being mounted, from the power supply system including the battery 295 through a signal line connected to the power supply system. When activated by the electrical power supplied from the battery 295, the rewriting control unit 220 is configured to execute activation of the update program without requesting the user to consent, on the condition that the consent information is held.

When the battery 295 is remounted at time t6, the rewriting control unit 220 causes the ECU 206 to execute activation of the update program. The activation of the update program continues. When the activation is completed at time t7, the rewriting control unit 220 becomes deactivated and wait the IG switch becomes on.

When the IG switch becomes on at time t8, the rewriting control unit 220 causes the IVI 299 to display an update end screen, which indicates that the program update is over, thereby notifying the user that the program update is completed. In this way, according to the control system 200, even if the battery 295 is removed during the program update, the program update processing can be continued without interruption, and therefore, the program update can be completed without delay. Thus, it is possible to avoid a situation that a user is forced to wait until the program update is completed when the user desires to drive and move the mobile object. Moreover, when the rewriting of the update program is completed, the rewriting control unit 220 deactivates the step-down converter and waits for the remount of the low-voltage battery 295. After detection of the remount of the low-voltage battery 295, the rewriting control unit 220 performs the activation. By this structure, it becomes possible to avoid a situation in which power control of the high-voltage power system is failed during activation of the update program by resetting the ECU 206.

FIG. 7 shows an example of a data structure of update information that is managed by the ECU 202. The update information is information that associates an 'ECU ID', a 'program ID' and an 'update status'. The update information is stored in the storage unit 270 of the ECU 202.

The 'ECU ID' is identification information for identifying an ECU that is a target of the program update. The 'program ID' is identification information for identifying an update program. The 'update status' is information indicative of a status of the program update.

The 'update status' includes 'downloading', 'overwriting', 'overwriting completed', 'acquiring consent', 'consent acquisition completed', 'activating', 'notifying activation completion', and the like. 'Downloading' indicates that the ECU 202 is receiving the update program from the external apparatus 70. 'Overwriting' indicates that the update program is being written to the program storage area in the ECU that is an update target. 'Overwriting completed' indicates that the writing of the update program to the program storage area in the ECU that is an update target has been completed. 'Acquiring consent' indicates that a user's consent to the program update is being acquired. 'Acquiring consent' indicates a state where the consent acquisition screen 400 is being displayed. 'Consent acquisition completed' is an example of the consent information indicating that the user's consent to the program update has been obtained, for example, through the consent acquisition screen 400. 'Activating' indicates that activation is being executed. 'Notifying activation completion' indicates, for example, a state where the update end screen is being displayed. 'Downloading', 'Overwriting', 'Overwriting completed', 'acquiring consent', 'consent acquisition completed', 'activating' and 'notifying activation completion' are examples of information indicative of an execution state of the program update.

The rewriting control unit 220 updates the update information stored in the storage unit 270, according to a progress of the program update. The update information exemplified in FIG. 7 shows the update information stored in the storage unit 270 at time t3 of the time chart shown in FIG. 4. 'E001' in FIG. 7 is identification information of the ECU 204, and 'E002' is identification information of the ECU 205. At time t3, since the user's consent to the program update has been acquired, 'consent acquisition completed' is set for both the ECU IDs 'E001' and 'E002'. Since the update program of the ECU 204 is being written at time t3, 'writing' is set for the ECU ID 'E001'. Since the overwriting of the update program in the ECU 205 has been completed at time t3, 'writing completed' is set for the ECU ID 'E002'.

Figure 8:
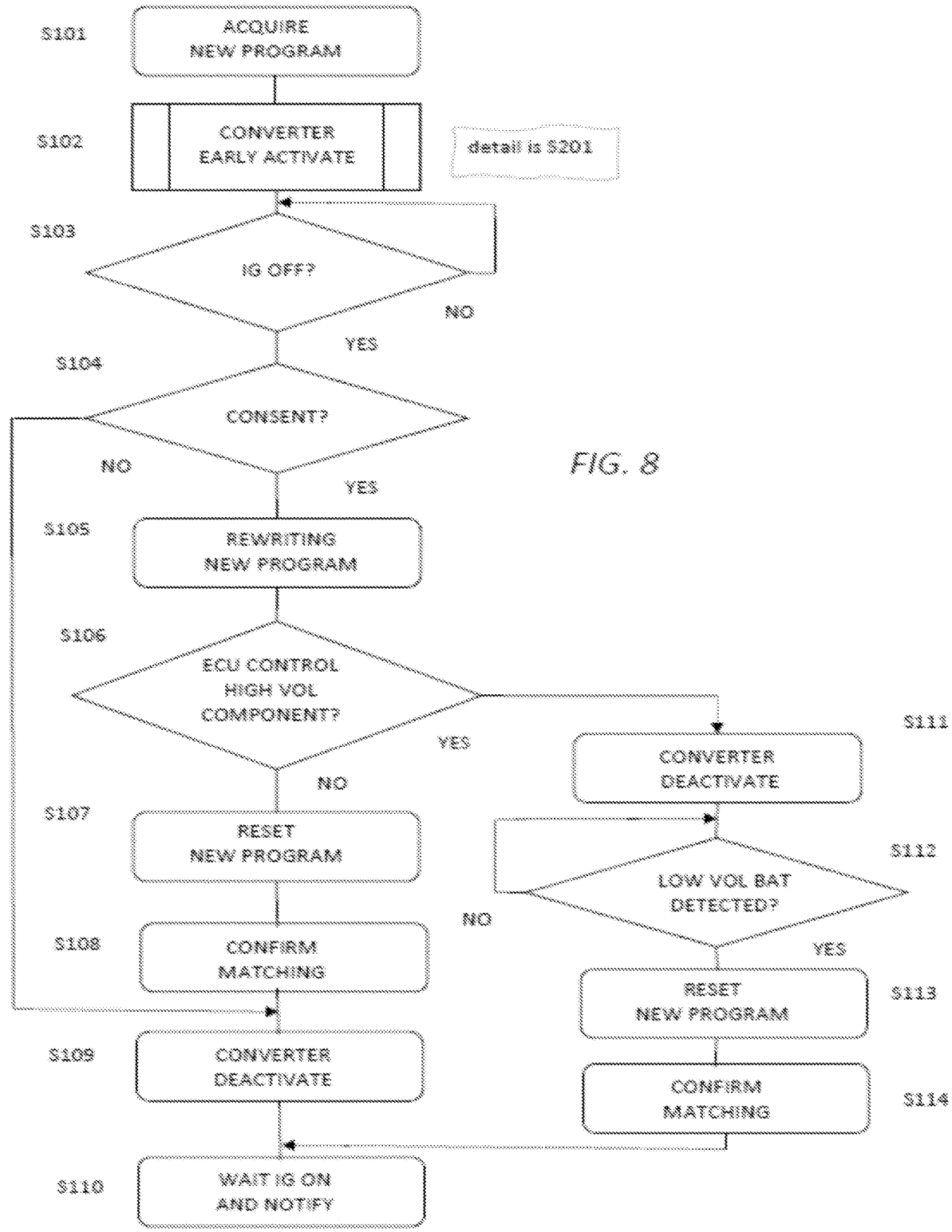
FIG. 8 is a flowchart showing an execution procedure of converter activating processing that is executed by the ECU 202.

FIG. 8 is a flowchart showing an execution procedure of converter activating processing that is executed by the ECU 202. The processing of the flowchart of FIG. 8 is performed after the IG switch becomes on.

At S101, the rewriting control unit 220 acquires an update program. For example, the rewriting control unit 220 receives a notification from the external apparatus 70 notifying that there is a new update program for certain ECU. If a download of an update program for the ECU from the external apparatus 70 is completed, the rewriting control unit 220 moves to S102. At S102, the rewriting control unit 220 performs the converter early activation, then moves to S103. The details of the converter early activation are described below. At S103, the rewriting control unit 220 determines whether IG switch is turned off. If the answer is "NO," the rewriting control unit 220 waits the IG switch off status. If the answer is "YES" at S103, the rewriting control unit 220 moves to S104 and determines whether a user's consent to the program update has been acquired, based on the update information. For example, when the status of the update information includes 'consent acquisition completed', it is determined that the user's consent to the program update has been acquired. If the user turns down the consent (S104 is "NO"), the rewriting control unit 220 deactivates the converter at S109 which has been activated.

When the user's consent to the program update has been acquired, the rewriting control unit 220 performs rewriting of the target ECU at S105. When the rewriting is completed, the rewriting control unit 220 moves to S106 and determines whether the target ECU is a ECU which controls a component which is a part of the high-voltage power system. If the answer is "NO" at S106, the process moves to S107 and performs the activation of the updated program. More specifically, the rewriting control unit 220 resets the target ECU with the updated program. Then, after resetting the target ECU, at S108, the rewriting control unit 220 performs confirming process by determining whether the new software rewritten on the electronic control unit is matched with the electronic control unit. For example, the rewriting control unit 220 activates the target ECU, and then, sends an inquiry and receives a reply from the target ECU. After performing the confirming process, the rewriting control unit 220 deactivates the converter at S109. After S109, for example, the rewriting control unit 220 may be deactivated and the process waits for the IG switch to be turned on at S110. When the IG switch is turned on, the rewriting control unit 220 is activated and notifies of the result of software update by, for example, displaying the result.

On the other hand, if the answer is "YES" at S106, the process moves to S111 and the rewriting control unit 220 deactivates the converter. Then, the rewriting control unit 220 moves to S112 and determines whether the low-voltage battery 295 is remounted or not. If the answer is "NO," the process waits. If the answer is "YES," the rewriting control unit 220 moves to S113. This can be done by detecting voltage in the low-voltage power system. At S113, the rewriting control unit 220 resets the target ECU with the updated program. By confirming that the low-voltage battery 295 is remounted and power is supplied by the battery 295 before resetting the target ECU, it becomes possible to prevent control loss of power control of the high-voltage power system.

Then, after resetting the target ECU, at S114, the rewriting control unit 220 performs confirming process by determining whether the new software rewritten on the electronic control unit is matched with the electronic control unit. For example, the rewriting control unit 220 activates the target ECU, and then, sends an inquiry and receives a reply from the target ECU. After performing the confirming process, for example, the rewriting control unit 220 may be deactivated and the process waits for the IG switch to be turned on at S110. When the IG switch is turned on, the rewriting control unit 220 is activated and notifies of the result of software update by for example, displaying the result.

Converter Early Activation

Figure 9:
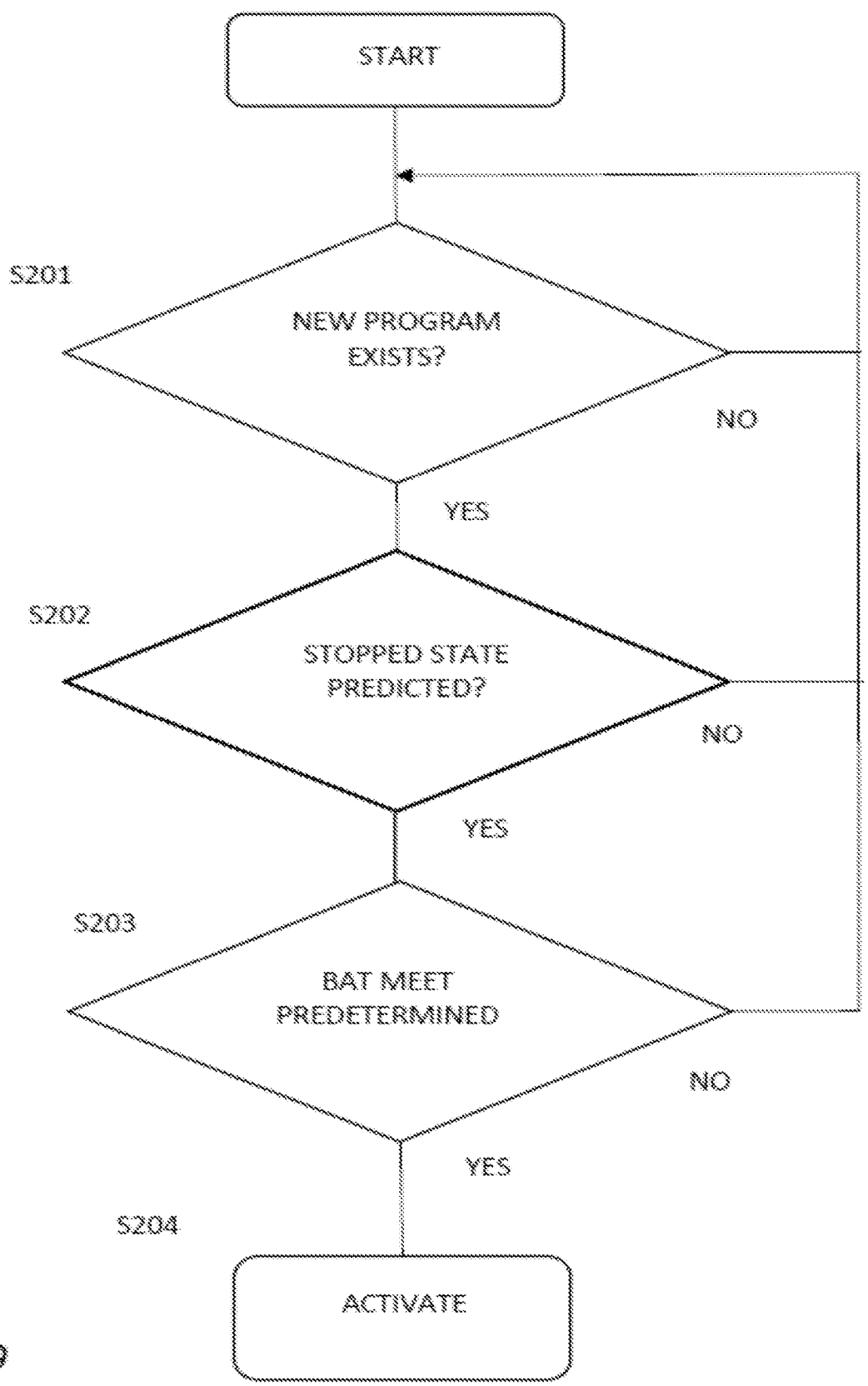
FIG. 9 is a flowchart showing an execution procedure of converter activating processing that is executed by the ECU 202.

FIG. 9 is a flowchart showing an execution procedure of converter activating processing that is executed by the ECU 202. The processing of the flowchart of FIG. 9 is performed after the IG switch becomes on. At S201, the rewriting control unit 220 determines whether a new program to be acquired exists. More specifically, for example, in S201, the rewriting control unit 220 determines whether the new program has been downloaded from the external apparatus 70 via the network. Alternatively or in addition, the rewriting control unit 220 determines whether a notification has been received from the external apparatus 70 via the network while the IG switch was on, the notification notifying of existence of the new program to be acquired. When the answer is NO at S201, the process goes in the loop to repeat. When the answer is YES at S201, the process moves to S202.

At S202, the rewriting control unit 220 determines whether it is predicted that the mobile object becomes stopped state. More specifically, for example, in S202, the rewriting control unit 220 determines whether speed of the mobile object is zero. Alternatively or in addition, the rewriting control unit 220 determines whether a shifter of the mobile object is in a parking position. As shown by FIG. 2, the rewriting control unit 220 is connected to a vehicle controller 207 which calculates and maintain various information about the status of the vehicle 20 such as a travel speed or a shifter position. For example, the vehicle controller 207 receives various signals from sensors 730 such as a shifter position sensor, a vehicle speed sensor. When the answer is NO at S202, the process goes in the loop to repeat. When the answer is YES at S202, the process moves to S103.

At S203, the rewriting control unit 220 determines whether status of the high-voltage battery satisfies a predetermined condition. More specifically, for example, in S203, the rewriting control unit 220 obtains SOC (State-of-charge) of the high-voltage battery and determines whether the obtained SOC is equal to or larger than a predetermined SOC. When the answer is NO at S203, the high-voltage battery does not store sufficient power and the process goes in the loop to repeat. By checking the state of SOC of the high-voltage battery, it is possible to prevent the situation that after rewriting the program, the mobile object does not have enough power to start an electric motor. In other words, it becomes possible to make sure that the high-voltage battery has enough power to move the mobile object by delaying update of the program to the next possible opportunity.

When the answer is YES at S203, the process moves to S104. At S204, the rewriting control unit 220 activates the step-down converter.

In this way, according to the converter early activation processing, it becomes possible to activate the step-down converter earlier to reduce wait time for activating the converter after the IG switch is turned off.

The vehicle 20 is a vehicle as an example of transportation equipment. The vehicle may be an automobile such as an automobile having an internal combustion engine, an electric vehicle and a fuel cell vehicle (FCV). The automobile includes a bus, a truck, a two-wheeled vehicle and the like. The vehicle may be a saddle-type vehicle and the like, and may be a motorcycle. The transportation equipment includes equipment such as an airplane including an unmanned aerial vehicle and a ship, in addition to the vehicle. The transportation equipment may any equipment configured to transport people or goods. The transportation equipment is an example of the mobile object. The mobile object is not limited to the transportation equipment and may be any movable equipment.

Figure 10:
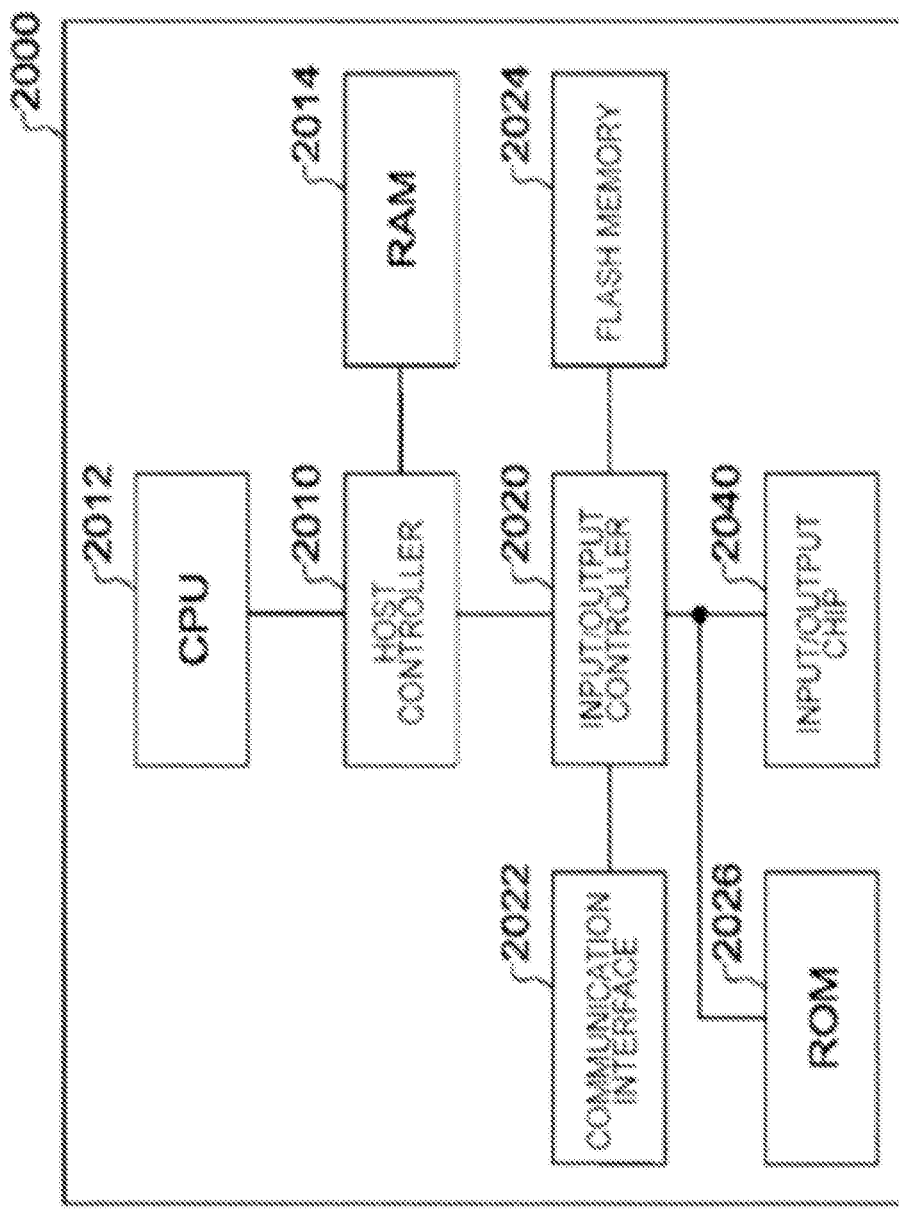
FIG. 10 shows an example of a computer 2000.

FIG. 10 shows an example of a computer 2000 where a plurality of embodiments of the present disclosure may be entirely or partially embodied. A program that is installed in the computer 2000 can cause the computer 2000 to function as a system such as the control system of the embodiment or each unit of the system or as an apparatus such as an information processing apparatus or each unit of the apparatus, to execute operations associated with the system or each unit of the system or the apparatus or each unit of the apparatus, and/or to execute the process of the embodiment or steps thereof. Such a program may be executed by a CPU 2012 so as to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 is configured to operate according to programs stored in the ROM 2026 and the RAM 2014, thereby controlling each unit.

The communication interface 2022 is configured to communicate with other electronic devices via a network. The flash memory 2024 is configured to store a program and data that are used by the CPU 2012 in the computer 2000. The ROM 2026 is configured to store a boot program or the like that is executed by the computer 2000 at boot-up, and/or a program depending on hardware of the computer 2000. The input and output chip 2040 may also be configured to connect various input and output units such as a keyboard, a mouse, and a monitor, to the input and output controller 2020 via input and output ports such as a serial port, a parallel port, a keyboard port, a mouse port, a monitor port, a universal serial bus (USB) port and a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and is executed by the CPU 2012. Information processing described in these programs is read into the computer 2000, resulting in cooperation between the programs and the various types of hardware resources described above. An apparatus or a method may be constituted by realizing an operation or processing of information according to a use of the computer 2000.

For example, when communication is performed between the computer 2000 and an external device, the CPU 2012 may be configured to execute a communication program loaded onto the RAM 2014 to instruct communication processing to the communication interface 2022, based on processing described in the communication program. The communication interface 2022 is configured, under control of the CPU 2012, to read transmission data stored on a transmission buffer processing area provided in a recording medium such as the RAM 2014 and the flash memory 2024, to transmit the read transmission data to the network, and to write reception data received from the network to a reception buffer processing area or the like provided on the recording medium.

In addition, the CPU 2012 may be configured to cause all or a necessary portion of a file or a database, which has been stored in a recording medium such as the flash memory 2024, to be read into the RAM 2014, thereby executing various types of processing on the data on the RAM 2014. Next, the CPU 2012 is configured to write the processed data back to the recording medium.

Various types of information, such as various types of programs, data, tables, and databases, may be stored in the recording medium and may be subjected to information processing. The CPU 2012 may be configured to execute, on the data read from the RAM 2014, various types of processing including various types of operations, processing of information, conditional judgment, conditional branching, unconditional branching, search and replacement of information, and the like described in the present specification and specified by instruction sequences of the programs, and to write a result back to the RAM 2014. The CPU 2012 may also be configured to search for information in a file, a database, etc., in the recording medium. For example, when a plurality of entries, each having an attribute value of a first attribute associated with an attribute value of a second attribute, is stored in the recording medium, the CPU 2012 may be configured to search for an entry having a designated attribute value of the first attribute that matches a condition from the plurality of entries, and to read the attribute value of the second attribute stored in the entry, thereby obtaining the attribute value of the second attribute associated with the first attribute that satisfies a predetermined condition.

The programs or software modules described above may be stored in a computer-readable storage medium on or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program that is installed in the computer 2000 and causes the computer 2000 to function as the control system 200 may work on the CPU 2012 and the like to cause the computer 2000 to function as each unit of the control system 200, respectively. Information processing described in these programs are read into the computer 2000 to cause the computer to function as each unit of the control system 200, which is a specific means realized by cooperation of software and the various types of hardware resources described above. Then, with these specific means, by realizing computing or processing of information according to an intended use of the computer 2000 in the present embodiment, the specific control system 200 is constructed according to the intended use.

Various embodiments have been described with reference to the block diagrams and the like. In the block diagrams, each block may represent (1) a step of a process in which an operation is executed, or (2) each unit of an apparatus having a role in executing the operation. Certain steps and each unit may be implemented by dedicated circuitry, programmable circuitry supplied with computer-readable instructions stored on computer-readable storage media, and/or processors supplied with computer-readable instructions stored on computer-readable storage media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions to be executed by a suitable device, and as a result, the computer-readable storage medium having the instructions stored thereon constitutes at least a part of an article of manufacture including instructions that can be executed to provide means for performing operations specified in the processing procedures or block diagrams. Examples of the computer-readable storage media may include an electronic storage medium, a magnetic storage medium, an optical storage medium, an electromagnetic storage medium, a semiconductor storage medium, and the like. More specific examples of the computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as a 'C' programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to provide means for performing operations specified in the described processing procedures or block diagrams. Examples of processors include computer processors, processing units, microprocessors, digital signal processors, controllers, microcontrollers, and the like.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications. In the accompanying claims, a processor is not limited to a single processor, a processor may be implemented by one or more processor. Also, multiple processes or functions may be implemented by a single processor.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A program update control apparatus comprising:
an acquisition processor, by using a processor, acquiring new program from an external apparatus via a network;
a rewriting control processor, by using a processor, performing a rewriting control of rewriting a program of an electronic control unit equipped with a mobile object, the rewriting being performed by using the acquired new program during drive of the mobile object is disabled;
a low-voltage power system comprising a low-voltage battery configured to supply electrical power to the rewriting control unit and the electronic control unit;
a high-voltage power system comprising a high-voltage battery configured to store electric energy to move the mobile object;
a step-down converter configured to step-down convert the power of the high-voltage battery to the power of the low-voltage power system, wherein
when the rewriting control processor performs the rewriting control of the rewriting the program of the electronic control unit, the rewriting control processor activates the step-down converter to supply power from the high-voltage power system to the low-voltage power system via the step-down converter,
wherein the rewriting control processor:
performs a power supply stop control of stopping power supply from the high-voltage power system to the low-voltage power system via the step-down converter after the rewriting control of rewriting the program of the electronic control unit,
wherein the rewriting control processor:
resets the electronic control unit after completion of the rewriting of the program of the electronic control unit, and after the resetting control, performs a confirming control of confirming whether the new software rewritten on the electronic control unit is matched with the electronic control unit, and after the confirming control, performs the power supply stop control.

2. The program update control apparatus according to claim 1, further comprises a notification processor, by using a processor, notifying of an information about an execution of the rewriting control to a user of the mobile object.

3. The program update control apparatus according to claim 1, further comprises a notification processor, by using a processor, notifying of an information about an execution of the rewriting control to a user of the mobile object, wherein the rewriting control processor:

determines whether the electronic control unit is a first electronic control unit or a second electronic control unit, wherein the first electronic control unit is an electronic control unit which is not related to a control of a component of the mobile object which is a part of the high-voltage power system and the second electronic control unit is an electronic control unit which controls a component of the mobile object which is a part of the high-voltage power system, in a case when it is determined that the electronic control unit is the first electronic control unit, performs a resetting control of resetting the electronic control unit after completion of the rewriting of the program of the electronic control unit, and after the resetting control, performs a confirming control of confirming whether the new software rewritten on the electronic control unit is matched with the electronic control unit, and after the confirming control, performs the power supply stop control, in a case when it is determined that the electronic control unit is the second electronic control unit, performs the power supply stop control after completion of the rewriting of the program of the electronic control unit and before performing the resetting control.

4. The program update control apparatus according to claim 3, wherein the rewriting control processor:

in the case when it is determined that the electronic control unit is the second electronic control unit, performs the resetting control when the low-voltage battery is connected with the low-voltage power system, and performs the confirming control when the low-voltage battery is connected with the low-voltage power system.

5. The program update control apparatus according to claim 4, wherein the rewriting control processor:

determines whether the low-voltage battery is connected with or removed from the low-voltage power system, in a case when it is determined that the low-voltage battery is connected with the low-voltage power system, activates the resetting control and the confirming control.

6. The program update control apparatus according to claim 1, wherein the rewriting control processor activates the step-down converter to supply power from the high-voltage power system to the low-voltage power system via the step-down converter before the drive of the mobile object becomes disabled.

7. The program update control apparatus according to claim 6, wherein the rewriting control processor activates the step-down converter to supply power from the high-voltage power system to the low-voltage power system via the step-down converter in a case when the following conditions are satisfied:

(i) existence of the new program to be acquired is detected, and (ii) it is predicted that the mobile object becomes stopped state.

8. The program update control apparatus according to claim 7, wherein the rewriting control processor activates the step-down converter to supply power from the high-voltage power system to the low-voltage power system via the step-down converter in a case when the following condition is further satisfied:

(iii) status of the high-voltage battery satisfies a predetermined condition.

9. The program update control apparatus according to claim 6, wherein the rewriting control processor determines whether a consent for program update has been obtained, and when it is determined that the consent for program update has not been obtained after the drive of the mobile object becomes disabled, deactivates the step-down converter to stop supplying power from the high-voltage power system to the low-voltage power system via the step-down converter.

10. The program update control apparatus according to claim 1, wherein the rewriting control processor continues performing the rewriting control of the rewriting the program of the electronic control unit even if the low-voltage battery is removed from the low-voltage power system during the rewriting control.

11. A mobile object comprising the program update control apparatus according to claim 1.

12. A computer implemented method updating a program of an electronic control unit equipped with a mobile object, wherein the mobile object comprises a low-voltage power system comprising a low-voltage battery configured to supply electrical power to the rewriting control unit and the electronic control unit, a high-voltage power system comprising a high-voltage battery configured to store electric energy to move the mobile object, and a step-down converter configured to step-down convert the power of the high-voltage battery to the power of the low-voltage power system, the method comprising:

acquiring new program from an external apparatus via a network; and performing a rewriting control of rewriting the program of the electronic control unit, the rewriting being performed by using the acquired new program during drive of the mobile object is disabled; and when performing the rewriting control of the rewriting the program of the electronic control unit, activating the step-down converter to supply power from the high-voltage power system to the low-voltage power system via the step-down converter, the method further comprising performing a power supply stop control of stopping power supply from the high-voltage power system to the low-voltage power system via the step-down converter after the rewriting control of rewriting the program of the electronic control unit, wherein the rewriting control further comprises:

determining whether the electronic control unit is a first electronic control unit or a second electronic control unit, wherein the first electronic control unit is an electronic control unit which is not related to a control of a component of the mobile object which is a part of the high-voltage power system and the second electronic control unit is an electronic control unit which controls a component of the mobile object which is a part of the high-voltage power system, in a case when it is determined that the electronic control unit is the first electronic control unit,
performing a resetting control of resetting the electronic control unit after completion of the rewriting of the program of the electronic control unit, and
after the resetting control, performing a confirming control of confirming whether the new software rewritten on the electronic control unit is matched with the electronic control unit, and
after the confirming control, performing the power supply stop control, in a case when it is determined that the electronic control unit is the second electronic control unit,
performing the power supply stop control after completion of the rewriting of the program of the electronic control unit and before performing the resetting control.

13. The method according to claim 12, further comprises notifying of an information about an execution of the rewriting control to a user of the mobile object.

14. The method according to claim 12, wherein the rewriting control further comprises:
in the case when it is determined that the electronic control unit is the second electronic control unit,
performing the resetting control when the low-voltage battery is connected with the low-voltage power system, and
performing the confirming control when the low-voltage battery is connected with the low-voltage power system.

15. The method according to claim 14, wherein the rewriting control further comprises:
determining whether the low-voltage battery is connected with the low-voltage power system,
in a case when it is determined that the low-voltage battery is connected with the low-voltage power system,
activating the resetting control and the confirming control.

16. The method according to claim 12, wherein the rewriting control activates the step-down converter to supply power from the high-voltage power system to the low-voltage power system via the step-down converter before the drive of the mobile object becomes disabled.

17. A non-transitory computer-readable storage medium having stored thereon a program that cause a computer to execute a method of updating a program of an electronic control unit equipped with a mobile object, wherein the mobile object comprises
a low-voltage power system comprising a low-voltage battery configured to supply electrical power to the rewriting control unit and the electronic control unit,
a high-voltage power system comprising a high-voltage battery configured to store electric energy to move the mobile object, and
a step-down converter configured to step-down convert the power of the high-voltage battery to the power of the low-voltage power system, the method comprising:
acquiring new program from an external apparatus via a network; and
performing a rewriting control of rewriting the program of the electronic control unit, the rewriting being performed by using the acquired new program during drive of the mobile object is disabled; and
when performing the rewriting control of the rewriting the program of the electronic control unit, activating the step-down converter to supply power from the high-voltage power system to the low-voltage power system via the step-down converter,
wherein the performing the rewriting control of the rewriting the program of the electronic control unit comprises activating the step-down converter to supply power from the high-voltage power system to the low-voltage power system via the step-down converter before the drive of the mobile object becomes disabled including before an ignition switch of the mobile object is turned off.

* * * * *